US011820911B2

(12) United States Patent
Issartel et al.

(10) Patent No.: US 11,820,911 B2
(45) Date of Patent: Nov. 21, 2023

(54) COLOURED COATING ADAPTED FOR WATCH COMPONENTS

(71) Applicant: ROLEX SA, Geneva (CH)

(72) Inventors: Jean-Paul Issartel, Geneva (CH); Nadji Salhi, Geneva (CH); Fernanda Rossetti, Winterthur (CH); Helena Schall, Winterthur (CH); Martin Winkler, Galgenen (CH); Stefanie Zuber, Zurich (CH)

(73) Assignee: Rolex SA, Geneva (CH)

( * ) Notice: Subject to any disclaimer, the term of this patent is extended or adjusted under 35 U.S.C. 154(b) by 169 days.

(21) Appl. No.: 17/085,737

(22) Filed: Oct. 30, 2020

(65) Prior Publication Data

US 2021/0139738 A1 May 13, 2021

(30) Foreign Application Priority Data

Nov. 8, 2019 (EP) .................................... 19207925

(51) Int. Cl.
*C09D 175/04* (2006.01)
*C09D 7/61* (2018.01)
(Continued)

(52) U.S. Cl.
CPC ............. *C09D 175/04* (2013.01); *C09D 5/29* (2013.01); *C09D 7/20* (2018.01); *C09D 7/41* (2018.01);
(Continued)

(58) Field of Classification Search
CPC ...... G04B 19/12; G04B 37/221; G04B 19/18; C09D 5/29; C09D 7/20; C09D 7/41; C09D 7/61; C09D 175/04; C08K 3/04; C08K 3/22; C08K 3/36; C08K 2003/2227; C08K 2201/011
See application file for complete search history.

(56) References Cited

U.S. PATENT DOCUMENTS

2014/0093738 A1* 4/2014 Bimanand ........... C23C 14/0036
428/425.9
2017/0274564 A1* 9/2017 Wade ..................... C08G 18/44

FOREIGN PATENT DOCUMENTS

CN 106661174 A 5/2017
EP 1548524 A1 6/2005
(Continued)

OTHER PUBLICATIONS

Dr. Michael Berkei, "BYK Nanotechnology Additives for Functional Coatings." Oct. 21, 2013. 16 pages.
(Continued)

*Primary Examiner* — Vishal V Vasisth
(74) *Attorney, Agent, or Firm* — Pearne & Gordon LLP

(57) ABSTRACT

Disclosed is a coating composition for watch elements, comprising
a binder, preferably a two-component polyurethane;
one or more pigments, preferably in quantities from 19 to 58% by weight of pigments (based on total solids of the composition);
at least one filler;
a solvent or a solvent combination, preferably butyl acetate and/or ethyl lactate.
optionally one or more commonly used additives, customary auxiliaries or combinations of them.
Further disclosed are a kit-of-parts, a coating on a watch element, a process for coating a watch element and a watch obtainable by said process or comprising said coating.

17 Claims, 5 Drawing Sheets

(51) Int. Cl.
 *C09D 7/20*    (2018.01)
 *C09D 7/41*    (2018.01)
 *C09D 5/29*    (2006.01)
 *G04B 19/12*    (2006.01)
 *G04B 37/22*    (2006.01)
 *C08K 3/04*    (2006.01)
 *C08K 3/36*    (2006.01)
 *C08K 3/22*    (2006.01)
 *G04B 19/18*    (2006.01)

(52) U.S. Cl.
 CPC .............. *C09D 7/61* (2018.01); *G04B 19/12* (2013.01); *G04B 37/223* (2013.01); *G04B 37/225* (2013.01); *C08K 3/04* (2013.01); *C08K 3/36* (2013.01); *C08K 2003/2227* (2013.01); *G04B 19/18* (2013.01)

(56) References Cited

FOREIGN PATENT DOCUMENTS

| EP | 1640822 A1 | 3/2006 | |
| EP | 2423763 A2 * | 2/2012 | ........... G04B 37/223 |
| EP | 2423763 A2 | 2/2012 | |
| EP | 2628607 A1 | 8/2013 | |
| WO | 2010006887 A1 | 1/2010 | |
| WO | 2013178412 A1 | 12/2013 | |
| WO | 2016/028568 A1 | 2/2016 | |

OTHER PUBLICATIONS

Kong, et al. "Research Progress and Application of Rubber Material in Watchstrap." China Academic Journal Electronic Publishing House. 2018. 3 pages. Only abstract is in English.

* cited by examiner

COLOURED COATING ADAPTED FOR WATCH COMPONENTS

The invention concerns a (preferably conformal) coloured coating adapted for watch components. Advantageously, the coating is applied in recesses of the watch component. The invention further relates to a coating composition for watch components and a coating process, as well as coated watch components.

TECHNICAL FIELD

There is a need for intense decorative coatings with good environmental and abrasion and scratch resistance, either in an aesthetic purpose or for improving readability of watch components. For example, small elements such as letters or numbers are added to watch bezels to indicate a second time zone or a tachymeter.

Such coatings are usually deposited into a recess and can fill the recess, being flush with the upper surface of the component, or being "conformal" to the contours of the recess. Actual solutions for conformal coatings are either limited in the available metallic colours that can be deposited by PVD and/or have a poor resistance to environmental conditions or to scratches.

OBJECT OF THE INVENTION

The invention aims to alleviate these drawbacks by allowing both the use of intense colours and the respect of a multilevel structure by being conformal to the surfaces of a recess. Furthermore, the object of the invention is to provide a coating having an enhanced resistance to scratches and to environmental conditions (sweat, UV, etc.).

The invention provides a coating for a watch component, a watch component comprising such coating, the coating's deposition process and the specific composition of the coating composition as described hereafter.

STATE OF THE ART

The use of enamels, galvanic coatings, varnishes or luminescent materials for the decoration of a watch component is well known in the watch industry, in particular for the decoration of components with recesses, i.e., a component whose surface to be decorated has one or more recesses, for example a watch bezel with engraved recesses. The recesses may form, for example, graduations, trade name, brand logo or any other decorative form. The component is decorated in an aesthetic purpose or to improve readability. To achieve this purpose, a colour difference or a texture difference between the different features is required.

For example, components are decorated timepiece components such as a housing, a bezel, a bezel disk, a dial, a bracelet, a component of a clock movement, etc.

For instance, in bezel marking (e.g., dive timer or tachymeter), the surface is either etched or engraved to create recesses. The latter are coated with a lacquer or varnish in order to accentuate the marking. The coating may fill up the recess (filling coatings) or only cover the bottom surface of the recesses (thin coating) or cover all the surfaces of the recesses in a conformal way (conformal coatings). The coating may also be applied on the upper surface, outside of the recesses. The choice of any of these solutions is essentially an aesthetic one.

Filling Coatings

WO 2013/178412 A1 teaches the embedding of decorations in a ceramic element. The recesses are filled up with an organic matrix loaded with ceramic particles that is then cured. The thus forms a "composite ceramic". In a further step, excess material is removed by polishing or other suitable techniques. The resulting decoration is flush with the upper surface of the ceramic element.

EP 2 628 607 A1 teaches the use of galvanic coating to entirely fill up recesses and the need of an additional securing device to improve the adherence of the galvanic coating. Only metallic decorative coatings can be obtained; it is thus not possible to get intense colours. WO 2010/0006887 A1 teaches the use of amorphous material to entirely fill up recesses in watch components by incrustation of the amorphous material in a recess. The resulting decoration is flush with the upper surface of the decorative piece thanks to a polishing step.

Thin Coatings

Decorated surfaces may be subject to loss of gloss from scratching and micro-scratching due to surface cleaning, and/or from ultraviolet degradation due to long-term exposure to sunlight.

Consequently, thin coloured coatings are often limited to the bottom of the recess to be protected, at least from scratches. That is, the side walls of the recesses are not coated in these cases.

EP1 640 822 A1 teaches a multi-stage enamelled dial, i.e., a dial whose base plate has one or more recesses, or conversely bumps, the surface of said plate being covered with layers of enamel. The vitreous enamel needs to be applied by successive thin layers and firing is needed in order to get a vitreous coating. Furthermore, vitreous enamels do not have a conformal behaviour, therefore the contour of the recess is not uniformly coated, affecting the visual aspect. With this technique, it is not possible to colour the sides of the recess.

EP 1 548 524 A1 describes the use of PVD to deposit a metal layer consisting of two different layers (one of Ti, Ta, Cr or Th, the second of Au, Pt, Ag, CrN, Ni, Pt, TiN, ZrN Pd or their alloys) in order to deposit a decorative coating. Only metallic decorative coatings can be obtained. Under certain parameters, the sides of the recesses are also coloured. It is not possible to get colours that are different from the metallic colours.

Some watch products that can be found on the market show bezels with intense colour in recesses. It is a simple paint or a simple lacquer that fills up the recess and/or forms a meniscus on the bottom of the recess. That is, it is neither conformal nor thin according to the above-explained terms. The side walls of the recesses may be coated, but the coating is not conformal to the geometry of the recess. Usually their abrasion and/or scratch and/or ultraviolet resistance is poor.

In conclusion, regarding the abovementioned examples, there is a need for resistant intense colour coatings for watch parts with an improved visual aspect, i.e. recesses that keep their sharp definition even with a coloured coating, a proper abrasion and/or scratch resistance and an enhanced resistance to ultraviolet degradation.

The aim of the present invention is to alleviate all or some of the aforementioned drawbacks with a coating showing suitable mechanical strength (abrasion, scratch and impact resistance), ultraviolet radiation resistance and to improve the visual quality of the coating by creating a fully conformal coating having intense colours.

Intense colour according to the invention can be vivid, i.e., very high in chroma (strong) and intensely bright or can be a deep-black colour.

For this purpose, the invention relates to a timepiece component comprising recesses and/or surfaces coloured with a coating. The coating is a conformal coating and can be specifically applied in the recesses or on any other (three-dimensional) surfaces. The coating shows an intense colour with enhanced resistance to ultraviolet radiation and other environmental influences. The invention also relates to the initial composition of said conformal coating, before application on the component, called "coating composition".

Figure 1:
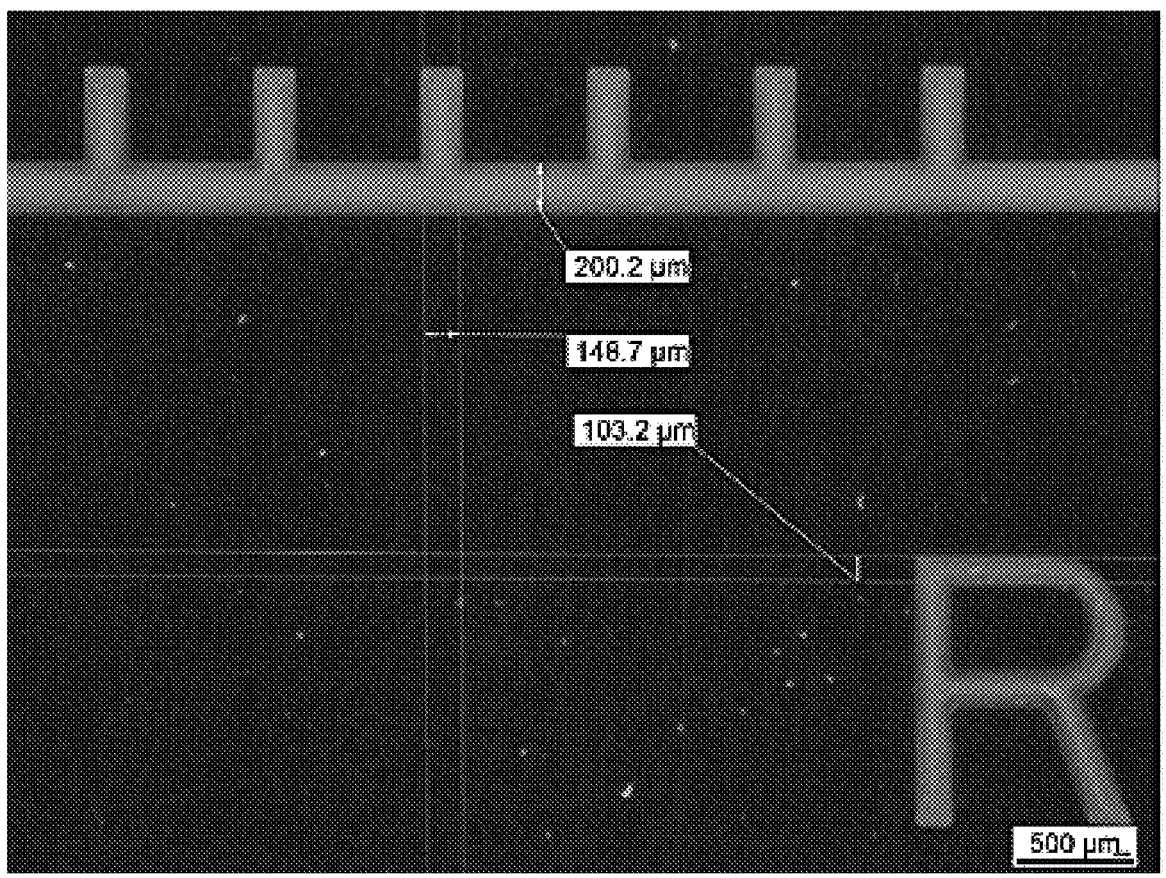
FIG. 1 shows an example of deposition in recesses of a width of 103 micrometres.

In particular, the invention provides the following aspects:
1. Coating composition for watch elements, comprising
    a binder;
    one or more pigments;
    at least one filler;
    a solvent or a solvent combination, preferably butyl acetate and/or ethyl lactate,
    optionally one or more commonly used additives, customary auxiliaries or combinations of them.
2. Coating composition according to claim 1 wherein the binder is a two-component polyurethane.
3. Coating composition according to claim 1 or 2, wherein the amount of pigments is 19 to 58 wt. % by weight based on total solids of the composition.
4. Kit of parts for forming a coating composition according to one or more of claims 1 to 3, wherein the two components of the polyurethane are formulated in two separate compositions.
5. Coating on a watch element, comprising
    a binder, preferably a two-component polyurethane;
    one or more pigments;
    at least one filler;
    optionally one or more commonly used additives, customary auxiliaries or combinations of them.
6. Coating on a watch element according to claim 5, wherein the binder is a two-component polyurethane.
7. Coating on a watch element according to claim 5 or 6, wherein the amount of pigment is 19 to 58 wt. % by weight based on total solids of the coating.
8. Coating according to one or more of claims 5 to 7, which is a conformal coating.
9. Coating according to one or more of claims 5 to 8, which has high scratch resistance, high durability and/or high optical covering power.
10. Coating according to one or more of claims 5 to 9, which has a matt, glossy or iridescent aspect.
11. Process for coating a watch element, comprising the steps
    a) optionally preparation of the substrate;
    b) optionally preparation of one or more homogeneous pastes, preferably as colour paste and/or filler paste;
    c) optionally preparation of a pre-mix of different pastes obtained in step b);
    d) preparation of the coating composition according to one or more of claims 1 to 3 from the paste(s) or pre-mix obtained in steps a) and/or b), or directly from the components;
    e) application of the coating composition onto the substrate;
    f) optionally drying
    g) curing of the coating composition to form the coating.
12. A watch element obtainable by the process of claim 11 or comprising a coating according to any of claims 5 to 10.

Coating

The coating of the invention is a polyurethane based coating, comprising a binder, one or more pigments, at least one filler and eventually additives. It is obtained from the inventive coating composition after deposition optionally drying, and curing.

The coating composition contains the same components as the coating and additionally one or more solvents. Since the difference between coating composition and coating is only the solvents, which are removed after application and curing, the amount of pigments in the coating is the same as that in the coating composition since it is expressed as based on total solids.

The coating composition comprises
    a) a binder;
    b) one or more pigments (based on total solids of the composition);
    c) at least a filler, such as $SiO_2$, $Al_2O_3$ or micro diamonds;
    d) a solvent or a solvent combination, such as butyl acetate and/or ethyl lactate;
    e) optionally one or more commonly used additives, customary auxiliaries or combinations of them.

The components in the present invention are explained in the following for the coating composition and the coating at the same time.

Binder

The binder preferably is a bi-component polyurethane (PU) based on an aliphatic diisocyanate and a polyol.

Generally, all types of known bi-component polyurethanes are suitable for the inventive coating composition.

The binder used in the present invention preferably has a relatively high reaction temperature, i.e., above 50° C. For example, reaction between polyol and hardener is completed after 1 hour at 80° C. followed by 2 hours at 150° C. Completion of the reaction is tested by Infra-red measurements and/or by thermal analysis. The thermal analysis is conducted by heating a test sample; if the heating induces an exothermal reaction, then the reaction is not completed.

The polyol is preferably a polyester polyol or a polyether polyol. It can be used in substance or in a suitable solvent as provided by the manufacturer.

Additionally, the polyol component may comprise additives such as stabilizers against oxidation or other commonly used additives as provided by the manufacturer.

The polyols may be straight-chain, slightly branched or branched polyols, preferably polyester polyols. Usually, they are aliphatic, saturated compounds.

The polyols which can suitably be used according to the invention generally have an OH content (measured according to DIN EN ISO 4629-2) of 6 to 9%, preferably 6.3 to 8.9%, more preferably 6.5 to 8.6%, or an OH number (measured according to DIN 53 240) between 50 and 240 mg KOH/g, preferably 55 to 230 mg KOH/g, respectively.

For example, WorléePol® VP 6778 (available form Worlée-Chemie GmbH, Hamburg, Germany) can be used as polyester polyol, which is a saturated polyol polyester resin based on a linear aliphatic polyol and which is suitable for the manufacture of solvent-based two-component PU systems. The $M_w$, measured by Size Exclusion Chromatography, of the polyol polyester of WorléePol® VP 6778 is ca. 2000 gmol$^{-1}$. WorléePol® VP 6778 (also designated as VP-U 1423/95) is a 78% solution in butyl acetate. The non-volatile content (1 h, 125° C., measured according to DIN EN ISO 3251) is 78%±1. The OH content of Worlée Pol® VP6778 is 7.8 wt. % (dry weight), and the viscosity is 10.000 to 45.000 mPa·s at 20° C., C 35/1, 50 s$^{-1}$ measured in a Rheometer. WorléePol® VP6778 is, according to the data sheet provided by the manufacturer, suitable for the formulation of two-component topcoats with excellent chemical resistance and very good flexibility, even at lower temperature. Other commercially available polyester polyols or polyether polyols are equally suitable according to the invention, such as Desmophen® VP LS 2328 (a linear short-chain polyester polyol available from Covestro AG; viscosity at 23° C. according to DIN EN ISO 3219/A.3: 800±50 mPa·s, OH content according to DIN EN ISO 4629-2: 7.95±0.35%, acid value according to DIN EN ISO 2114: <5.0 mg KOH/g), Desmophen®1100 (available from Covestro AG, branched polyester having hydroxyl groups, acid value according to DIN EN ISO 2114: 3 mg KOH/g, viscosity at 23° C. according to DIN EN ISO 3219: 30,500±5,500 mPa·s, hydroxyl content according to DIN EN ISO 4629-2: 6.5±0.45%), Desmophen® 800 (available from Covestro AG, highly branched hydroxyl containing polyester, acid value according to DIN EN ISO 2114: ≤4 mg KOH/g, viscosity at 23° C., 70% in 1-methoxypropylacetate-2 according to DIN EN ISO3219/A.3: 850 t 150 mPa·s, hydroxyl content according to DIN EN ISO 4629-2: 8.6±0.3%), Lupraphen® 2901/1 (available from BASF AG, partially branched polyester polyol stabilized against oxidation, stabilizer being fee of phosphite and BHT, acid number according to DIN EN ISO 2114: 2.5 mg KOH/g, viscosity at 25° C. according to DIN EN 12 092: 20,500 mPa·s, hydroxyl number according to DIN 53 240: 223 mg KOH/g), or Lupraphen® 2602/1 (available from BASF AG, slightly branched aliphatic polyester polyol, acid number according to DIN EN ISO 2114: 1.5 mg KOH/g, viscosity at 25° C. according to DIN EN 12 092: 21,650 mPa·s, hydroxyl number according to DIN 53 240: 59 mg KOH/g).

The second component of the bi-component PU binder is an isocyanate. Preferably, aliphatic diisocyanates or aliphatic polyisocyanates can be used.

Hexamethylene diisocyanate is particularly suitable, for example Tolonate™ HDT-LV2, a medium viscosity, solvent-free aliphatic polyisocyanate which is available from Vencorex France Société par Actions Simplifiée, Saint Priest, France.

Other suitable isocyanates are isophorone diisocyanate (IPDI) and 4,4'-diisocyanatodicyclohexylmethan (H12MDI).

Other commercially available bi-component polyurethanes can also be used according to the invention.

The two components of the binder are added to the coating composition separately as described below.

The coating composition is coated onto the watch elements within the pot life of the PU composition.

The binder, according to the invention, yields the main properties of the final product. The di- or polyisocyanate is commonly added in excess relative to the diol or polyol component. The advantage of adding an excess of the polyisocyanate (e.g., Tolonate™) lies in 3 points:

1. The residual presence of water in the polyol, which can compete with the polyol in the reaction with the diisocyanate. A yield of less than 100% will then be obtained.
2. An excess of Isocyanate can also further crosslink the binder matrix due to allophanate-formation which will lead to a more abrasion and scratch and chemical resistant coating.
3. The polyol reactive functionality content is not always known with accuracy.

For the preparation of the coatings of the invention, a 10% excess of diisocyanate relative to the diol or polyol component is preferably used to achieve better stability.

Pigments

Pigments as disclosed below are selected according to the invention in order to achieve a target colour, i.e., a specific Pantone or RAL tone.

The amount of pigment can be adjusted to have a suitable hiding power (i.e., optical covering power) of the coating. The amount is specified as above.

For example, organic or organometallic pigments may be selected from quinacridone pigments, quinacridonequinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, azo and diazo pigments, blue coloured organic pigments which include for example Heliogen™ Blue such as Heliogen blue L 7085, Heliogen™ Cyan, Sicopal™ Blue, red coloured organic pigments which include Irgazin™ red, rubine, scarlet, etc., Cinquasia™ magenta, pink, red, yellow coloured organic pigments which include Cromophtal Yellow L1084, Hostaperm™ Yellow HG3, Paliotol™ Yellow L0962 HD, Irgazin™ yellow, Sicopal™ Yellow, orange coloured organic pigments which include Hostaperm™ Orange GR; Irgazin™ orange, Sicopal™ Orange, green coloured organic pigments which include Heliogen™ green L8735, Sicopal™ Green, other types of organic pigments such as brown pigments, violet pigments, fluorescent pigments, etc., which include Cromophtal™ Brown, Cromophtal™ Violet.

As further examples, specific types of inorganic pigments include white pigments which include, e.g., titanium dioxide, zinc white, zinc sulfide or lithopone, Kronos™ 2310 (TiO2); black pigments which include carbon black, iron manganese black or spinel black; Emperor™ 1200, Lamp Black 101; chromatic pigments such as chromium oxide, chromium oxide hydrate green, cobalt green or ultramarine green, cobalt blue, ultramarine blue, manganese blue, ultramarine violet, cobalt violet, manganese violet, red iron oxide, cadmium sulfoselenide, molybdate red, ultramarine red, brown iron oxide, chromium orange, yellow iron oxide, nickel titanium yellow, chromium titanium yellow, cadmium sulfide, cadmium zinc sulfide, chromium yellow, bismuth vanadate, mixed metal oxides, spinel phases or corundum phases; chrome antimony titanium buff rutile such as Sicotan™ Yellow L1912, cobalt aluminate blue spinel ($CoAl_2O_4$) such as Sicopal™ Blue K 7210; cobalt titanite green spinel such as Sicopal™ Green EH2059 (L 9715); bismuth vanadium tetraoxide such as Sicopal™ Yellow L 1130, ferric oxide ($Fe_2O_3$) such as Bayferrox™ Red 130 M; yellow iron oxide such as Bayferrox™ 3920.

Pigments may be used alone or as a mixture of two or more pigments to achieve a specific colour tone.

The pigments and in a minor way the filler, will drive the hue and intensity of the colour, and the filler itself will allow for a proper mechanical resistance. Solvents and additives will make using the coating composition easier and/or enhance its properties.

The amount of binder (i.e., preferably polyurethane) based on the total composition is usually 15 to 60 wt. %. Under 15 wt. % of binder, the cohesion of the composition is not guaranteed. The amount of pigments is usually 19 to 58 wt. %, and the amount of filler is preferably 19 to 25 wt %, each based on the total composition, provided that the total of all components in the composition is 100 wt. %. If the composition contains less than 19 wt. % total amount of pigment and/or filler, it may not be opaque as requested.

Filler

As filler, commonly used fillers can be employed. For example, alumina, silica, spinel, silicates, zirconia, silicium carbide, quartz, industrial diamond, etc. can be suitably used according to the invention.

A mixture of alumina ($Al_2O_3$) types having different particle sizes is preferably used according to the invention, more preferably a mixture of alumina types having particle size (d50) of 12.8±1 µm and 6.5±1 µm at a ratio 70:30 at a concentration of 30 wt. % is used (such as Alodur® corundum F800 and F500). The abrasion resistance is increased eightfold compared to a coating without filler particles.

In an alternative, alumina particles are functionalized with a usual silane coupling agent such as aminopropyl-trimethoxysilane, N-(2-aminoethyl)-aminopropyl-trimethoxysilane, 3-glycidoxypropyl-trimethoxysilane, 3-methacrylpropyl-trimethoxysilane, vinyl-methoxysilane, etc. More preferably, the functionalized alumina particles are the above-defined mixture of alumina types having different particle sizes. The alumina particles have hydroxyl groups on their surface, which, by the functionalization reaction, react with the silane coupling agent by elimination of methanol. The obtained functionalized particles now have an amino group that can react with isocyanate and therefore covalently bind to the matrix of the coating composition. With aminopropyl-trimethoxysilane it has been observed that the abrasion resistance is increased about fourteen times compared to the coating without particles.

In another alternative, industrial diamonds 70% 8-15 µm and 30% 0.1-1 µm (% by weight, respectively) (microdiamonds) are used as filler. Monocrystalline diamond—MONO-ECO 0.5-1.0 µm 0.71 µm or monocrystalline diamond—MONO-ECO 8-15 µm is suitable, for example. Other similar "micro-diamond" (monocrystalline or not) could also be used.

The abrasion resistance is increased by adding the filler(s) to about 14 times compared to the lacquer without particles.

Advantageously an anti-settling agent such as Aerosil® 200 or Aeroxide® Alu C is added with the filler.

The use of filler particles has an impact on the colour of the coating. Therefore, the formulation of the composition has to take into account the presence of filler particles.

Filler particles can be added directly to the coating composition or can be provided as a paste. Filler paste can be added to the pre-mix described below.

In a specific embodiment, the filler paste contains the polyol specified above in amounts as deemed suitable.

Auxiliary agents may be added to the filler paste according to need.

For example, a stabilizing agent improves the effectiveness of polymeric wetting and dispersing additives when stabilizing phthalocyanine blue and green, organic violet pigments and carbon blacks. The stabilizing agent enables high-molecular weight wetting and dispersing additives to be more efficiently adsorbed on the surface of phthalocyanine blue and phthalocyanine green, organic violet pigments and carbon blacks; thereby increasing the effectiveness of the wetting and dispersing additives. Stabilization of the pigments is improved and higher pigment contents are possible as a result of a reduction in the viscosity.

For example, an anti-sagging agent prevents settling and sagging of particles/solids in the composition.

For example, a thixotropic agent reduces flooding and floating of particles/solids in the composition.

Solvent

A suitable solvent is contained in the coating composition for obtaining a suitable viscosity and to control evaporation rate of the composition so as to control the drying time of the coating. Suitable solvents may be butyl acetate, xylene, toluene and/or ethyl lactate. Butyl acetate and/or ethyl lactate are preferably used. The solvent is either added to the paste, to the pre-mix or to the coating composition to adapt the viscosity.

Advantageously, paste and pre-mix are prepared with butyl acetate.

Further advantageously, ethyl lactate is used in addition to butyl lactate in the coating composition to adapt the evaporation rate of the composition and to control the viscosity. The evaporation rate needs to be adapted in order to hinder the generation of cracks, porosity, craters, etc. Ethyl lactate is usually used in form of racemate, but it may also be used as either one of its enantiomers. It is preferably added to the composition just before coating.

A further advantage of ethyl lactate is that it is less toxic for the operator than other solvents such as butyl acetate.

Additives or Customary Auxiliaries

Depending on the chosen pigments and on the required aspect (shiny, matt), different additive or customary auxiliaries can be used in the composition of the invention. Examples of additives or customary auxiliaries are listed below:

Wetting and dispersing additive (Disperbyk®-161 or Disperbyk®-2150 or Solsperse® 32500);
Stabilizing agent (BYK®-SYNERGIST 210) for promoting pigment dispersion, essentially for blue or green pigments;
Agent for reducing the surface tension (BYK®-306);
Matting agent (Acematt®3300);
Adhesion promoter (WorléeAdd487);
Anti-sagging and anti-settling agent (BYK-E-410, Aerosil®200 or Aeroxide® Alu C);
Thixotropic agent (Aerosil®200, BYK-E-410);

UV-stabilizing additives such as Tinuvin™ 1130 or Tinuvin™ 123.

To prevent sedimentation of particles, an anti-settling agent can be added. Examples of anti-settling agents are Aerosil®200 (silica based) and Aeroxide® Alu C (alumina based).

As an alternative, in order to have the anti-settling agent uniformly dispersed, the anti-settling agent can be mixed with the polyester polyol, which is one component of the binder, such as WorléePol® VP6778 and solvent such as butyl acetate into a paste.

Additive or customary auxiliary paste can be used to prepare a pre-mix.

Advantageously the additive or customary auxiliary paste contains the polyester polyol, which is a component of the binder.

Preparation of the Coating Composition

In a first alternative, the different constituents of the composition (pigment, binder, solvent, filler, additives, customary auxiliaries) are directly mixed together.

In a second alternative, at least some constituents (pigment, filler and/or additives and/or customary auxiliaries) of the composition are provided as one or more pastes or as one or more pre-mixes. The paste and/or pre-mix are finally mixed together to form the composition of the invention.

Pastes or pre-mixes can be optionally milled in a mill, e.g., a bead mill (diameter of grinding beads was 0.5 mm, grinding speed between 4000 and 6000 rpm) to improve their homogenization.

An example of compositions is given hereunder in grams.

An orange coating composition is obtained by mixing under mild vacuum, around 40 mbar, 1.217 g of a first paste:
    a filler paste is prepared by mixing 0.167 g butyl acetate, 0.833 g of ethyl lactate, and 0.217 g of alumina ($Al_2O_3$ such as Alodur® corundum F800) (d50) of 6.5±1 µm;

0.174 g Tolonate™ HDT-LV2;

1 g of a pre-mix—see below example B

Examples of compositions are represented in Table 2.

The composition is applied within a suitable time before hardening of the composition occurs due to formation of the polyurethane. The time depends on the coating technology used as well as on the temperature. Further, the viscosity of the composition has to be coherent with the application technique. Viscosity can be optimised without undue burden and it is routine practice for the skilled person. The suitable time can be monitored by measuring the viscosity. The increase of viscosity for one orange lacquer has been monitored by the inventors. After 4 h, the viscosity started to increase significantly. It always depends on the solvent content and the used pigment and should be determined for every colour.

In order to achieve the needed dispersion of the pigments in the coating, the pigments can be mixed directly in the composition or a coloured paste can be prepared as described above and then added.

Alternatively, coloured pastes can be mixed together or with other pastes, such as filler pastes, additive pastes, or more complex pastes, etc., in a pre-mix. A complex paste is a paste with particles having different functions (pigment, filler, additive).

For the sake of simplifying the description, the term paste will be used herein to describe both simple and complex pastes.

Advantageously the pigment paste comprises polyol, preferably WorléePol®VP 6778.

Depending on the aimed colour and on the nature of the pigments, either an opacifying pigment such as titanium oxide is added to the composition to improve the hiding power of the coating or a two-layer structure can be used (white or metallic basecoat and coloured topcoat). That is, at first a white coating composition is coated, optionally dried and cured, and additionally on top thereof a coloured coating composition according to the invention is coated, optionally dried and cured.

Various types of pigments can be used such as organic pigments, organometallic pigments, inorganic pigments and metallic powder pigments, carbon black or fluorescent pigments.

Coating Process

The application of the coating composition can be done by different techniques known by a person skilled in the art and adapted to the structure of the substrate to be coated. Examples of coating techniques are spray coating, dip coating, spin coating, bar coating, Meyer bar coating, jet coating, brush deposition, dispensing technique by using a syringe, pad-printing, screen-printing, etc.

Some composition characteristics like viscosity, rheological behaviour, filler particle size, solvent concentration and solvent evaporation rate, need to be suitably adapted to the selected deposition technique. For watch bezels with recesses that are to be coloured with the coating composition, the coating composition can, for example, be advantageously deposited with a dispensing technique.

The coating can be applied in one layer or in two or more layers. After application of each layer, the coating is dried and cured.

Figure 2:
FIG. 2 is a schematic view of the coating process according to a first embodiment of the invention.

The coating composition is, for example, applied into a recess (illustrated in FIG. 2). The deposited volume must be adjusted to the volume of the recess.

In another realisation (illustrated in FIG. 3), the coating composition is applied on the surface of the watch part and in the at least one recess. After curing, the surface is polished with any appropriate techniques known by a person skilled in the art, thereby removing the coating on the surface, in order to leave the coating only in the recesses. Surface treatment(s) can be applied to the surfaces as described previously.

In another alternative (not illustrated), mainly when the coating is applied by a technique covering all the surface such as dip coating or spin coating, some recesses can be filled up with a temporary composition which can be easily removed by a conventional washing technique or any equivalent means, before the coating is applied—in order to colour only chosen recesses (i.e., those not filled with the temporary composition). The coating in excess is removed by any polishing technique and the temporary composition is removed. Surface treatment(s) can be applied to the surfaces as described previously.

Drying and Curing

The coated watch component can be cleaned and dried applying known techniques before curing.

Advantageously, curing of the coating composition occurs in two steps. As a non-limiting example, curing can be performed by heating for 1 hour at 80° C. followed by 2 hours at 150° C. in order to ensure that no isocyanate remains in the final product.

Detailed Description of the Coating Process

The coating process involves the following steps
    a) optionally preparation of the substrate;
    b) optionally preparation of one or more homogeneous pastes, preferably as colour paste and/or filler paste;

c) optionally preparation of a pre-mix of different pastes obtained in step b);
d) preparation of the coating composition according to one or more of claims 1 to 3 from the paste(s) or pre-mix obtained in steps a) and/or b), or directly from the components;
e) application of the coating composition onto the substrate;
f) optionally drying
g) curing of the coating composition to form the coating.

Preparation of the Substrate

The substrate is made of a material that is commonly used for manufacturing watch components. The material is not restricted particularly. It may be metal, for example stainless steel or precious metals such as gold (in particular gold alloys, e.g., 18 carat gold, white gold, yellow gold or red gold), silver alloys such as 875 silver, 925 silver or Sterling silver or platinum alloys, titanium, or other metals suitable for manufacturing of watch components, or a technical ceramic (for example zirconia (preferably stabilized by, e.g., yttrium), or alumina) or a cermet, or a polymer usually used for watches, such as polycarbonate, silicone or polyurethane, or composite material such as carbon fibre composite or glass fibre composite, or combinations of any of these materials, e.g., gold/white gold, gold/stainless steel, polymer/composite material, etc.

Regarding the fact that the coating is conformal (after drying and curing, the coating will firmly adhere to the walls and the bottom of the recess and give a hollow impression and a specific aspect), the geometry of the recess, especially of the bottom of the recess, may have an enhanced influence on the aesthetics of the final component. The coating will act similarly as a PVD coating on the bottom of the recess, with the advantage of the intense colour. Moreover, it can be made much thicker than a PVD coating so as to mask substrate irregularities or roughness.

The exact geometry of the recess (depth and width) has an influence on the final aesthetic result. Typical recess depths are from 60 to 300 micrometres. Typical recess widths are 50 µm to 6 mm. The geometry of a recess can have a regular shape (such as circular or rectangular or star-like) or an irregular shape, such as a number or letter. In case of an irregular shape, the largest width and largest depth are considered as depth and width in this description, respectively.

With an appropriate viscosity, even very narrow recesses can be filled with the coating composition. For example, narrow cavities of 100 micrometres width can be filled with the coating composition, in that case the coating of the recess is driven by capillary action known as Jurin's law.

The watch component is preferably prepared, washed and dried before the application of the coating.

The substrate, however, needs to be at least cleaned, i.e., washed, before applying the inventive coating. Cleaning (i.e., washing) is a standard step in any coating technology. Washing can be carried out before and/or after the optional preparation of the substrate, if a preparation step is carried out. Usually, it is done before the preparation.

In order for the inventive coating to adhere, no additional substrate preparation is needed. However, a preparation could bring out advantages such as avoiding delamination, irregularities, etc. in the coating.

Advantageously, the substrate is prepared for ceramic, with a first sand blasting, e.g., with corundum, in order to increase the contact surface. Alternatively, the surface can be modified through laser texturing, chemical etching, plasma etching or any other suitable technique.

Alternatively, or additionally, a chemical or physical treatment of the substrate can be applied to the substrate in order to further improve the adhesion of the coating on the substrate. By such treatment the surface can be functionalized in order to improve adherence of the PU coating.

Alternatively, or additionally, another chemical or physical treatment can be done on the surface onto which the coating should not adhere.

Washing is carried out using standard cleaning methods known to those skilled in the art. More specifically, washing is carried out with a suitable solvent such as acetone, ethanol, methanol, isopropanol, butanols, ethyl acetate, butyl acetate, methylethylketone, chloroform, n-heptane, n-hexane etc. or in aqueous phase containing detergents or using a gas such as oxygen, ozone etc. Several washing steps can be carried out subsequently, using the same or different fluid in each step.

Optionally, after each washing step, the washed substrate is dried, e.g., under warm air or any suitable methods known in the art.

Preparation of Homogenised Pastes

Pigments and/or customary auxiliaries and/or additives can be added to the coating composition directly or by means of one or more homogenised pastes which are prepared in advance.

The homogenised paste comprises pigments and/or customary auxiliaries and/or additives mixed together with solvent. The components are homogenized in a usual manner until the mixture appears homogeneous to the naked eye. The homogenization can, for example, be monitored by the following methods:

production of planar layers (several tens of cm$^2$) followed by observing and measuring the homogeneity of the colour, and observing the absence of agglomerates on the surface measuring the size of the particles or agglomerates with a fineness gauge of Zehnter GmbH thermogravimetric analysis (TGA) of different samples taken from the lacquer or the layer.

Advantageously, the homogenised paste comprises also the polyol component of the polyurethane binder.

In this case, if the pastes are made only with polyol, they have a satisfactory shelf life. It is also possible to add the isocyanate component of the polyurethane instead of the polyol to the paste.

Several different pastes, e.g., each containing a different pigment, can be prepared in advance, or only one paste.

Mixing the Paste—Example of a Coloured Paste

The polyol (preferably WorléePol® VP 6778), the solvent (preferably butyl acetate and/or ethyl lactate), the customary auxiliaries and additives (Disperbyk®-161 and Aerosil®200) are placed in a tin can and dispersed using a dissolver (ca. 2 min at ca. 4000 rpm). Portions of pigments are then added and mixed at low speed (ca. 500 rpm). For each portion, after the pigments are evenly distributed, the speed is increased to 4000-6000 rpm and the paste is dispersed for ca. 1 min. Once all pigments have been added, the paste is mixed for ca. 3 min at 5000-7000 rpm.

Examples of White, Yellow, Orange and Black colouring paste compositions are represented in Table 1.

TABLE 1

Examples of coloured pastes according to the invention

| Amount of element [wt. %] | paste colour | | | | | | |
|---|---|---|---|---|---|---|---|
| | White | Yellow | Orange | Cyan | Black | Red | Greyish-green |
| WorléePol ™ VP 6778 | 9-23 | 38-40 | 15-21 | 20-36 | 30-33 | 45-50 | 16-22 |
| Butyl acetate | 7-24 | 14-15 | 30-66 | 23-24 | 22-24 | | 5-8 |
| Disperbyk ®-161 | 4-6 | 15-16 | 7-13 | 6-22 | | 13-14 | 14-17 |
| Aerosil ® 200 or Aeroxide ® AluC Pigments | 0.3-1 | 0-1 | 0-0.4 | 1-2 | | 0.6-1 | 0.4-2 |
| Kronos ™ 310 (TiO$_2$) | 55-65 | 0-16 | 0-16 | 0-16 | | 0-65 | 52-58 |
| Hostaperm ™ Yellow H3G | | 30-32 | 0-14 | | | | |
| Hostaperm ™ Orange GR | | | 3-16 | | | | |
| Heliogen ™ Blue L 7085 | | | | 3-21 | | | |
| Bayferrox ™ Red 130 M | | | | | | | 0.1-0.12 |
| Sicopal ™ Blue K 7210 | | | | | | | 0.5-0.6 |
| Sicopal ™ Green EH2059 (L 9715) | | | | | | | 2-3 |
| Solsperse ® 32500 | | | | | 24-26 | | |
| Emperor ™ 1200 | | | | | 20-24 | | |
| Irgazin ™ Red | | | | | | 11-13 | |
| Cinquasia ™ Red | | | | | | 1-2 | |
| Lamp Black 101 | | | | | | 0.01-0.03 | |

Milling of the Paste with a Bead Mill

The coloured pastes as described above are preferably homogenised by milling, for example with a DYNO® Mill Research Lab from WAB (grinding beads with diameter of 0.5 mm; grinding speed of 6000 rpm). The pastes are grinded once (discontinuously). The particle size in the homogenised pastes is determined with a grindometer from TQC. The determination of the particle size is carried out according to DIN EN 21524.

A key feature of the invention is the pigment and/or filler particle size and their repartition into the coating composition. Particle size of pigment and/or filler is adapted to the nature of the pigments and/or filler.

Advantageously the pigment particle size is <10 μm, more advantageously <5 μm. For white pigments, the particle size usually is <10 μm, for coloured pigments, it is usually <5 μm, and for black pigments it is usually <1 μm.

Advantageously the filler comprises a ratio of 70 wt. % of particles<15 μm and 30 wt. % of particles<1 μm, more advantageously 70 wt. % of particles<13 μm and 30 wt. % of particles<7 μm.

Particle sizes according to the invention are determined in the composition by using a grindometer as described above.

Preparation of Pre-Mix

Alternatively, several pastes can be mixed together into a paste called herein pre-mix. If needed, the viscosity of the pre-mix can be adapted by adding solvent. The solvent is the same as described above, preferably butyl acetate and/or ethyl lactate. Most preferably, the solvent used for the pre-mix is butyl acetate.

Pre-mixing allows, for example, a fine tuning of the colour tone.

A pre-mix can be milled similarly to the process used for pastes described above.

During milling in all steps disclosed above, the temperature inside of the bead mill rises. So before starting the next run, the temperature inside of the bead mill is advantageously brought back to room temperature.

Preparation of the Coating Composition

Coating compositions preferably having 19 to 58 wt.-% pigments based on total solids are prepared. The amount of pigment depends on the specific pigments used. Below 19 wt. % the optical covering power of the composition is not sufficient. Above 58 wt %, it becomes difficult to have enough filler and binder in the composition. Actually, usually as much pigments as possible will be added to the composition, since a higher pigment ratio will raise the hiding power. However, some pigments have a very small particle size, and this raises the viscosity and makes grinding difficult (clogging of the bead mill etc.). Generally, the amount of pigment will be determined according to practical experience of the skilled person. For example, a relatively low pigment content will be appropriate for carbon black, and a relatively high pigment content will be suitable for titanium oxide.

Advantageously pastes or pre-mixes as described above are used. The pastes or pre-mixes are mixed together with diisocyanate and, if required, additional polyol and/or solvent and/or filler and/or additives and/or customary auxiliaries for preparing the coating composition of the invention.

The amounts of polyisocyanate and polyol are connected as described above, so in principle there is no need to add additional polyol Again, the solvent can preferably be butyl acetate and/or ethyl lactate, butyl acetate being preferred in terms of achieving an acceptable shelf life of the composition. Ethyl lactate is preferably used as additional solvent for preparing the composition, as mentioned above. However, butyl acetate could also be used as additional solvent in the last step.

Alternatively, solvent and diisocyanate and polyol and/or solvent and/or pigments and/or filler and/or additives and/or customary auxiliaries are directly mixed together for preparing the coating composition of the invention without the use of any paste or pre-mix.

Alternatively, the isocyanate and the polyol component of the PU binder are contained in different pastes which are then mixed together to form the coating composition shortly before coating the watch component. Thereby, the pastes form a kit-of-parts.

The coating composition according to the invention generally has an OH content of more than 7%, preferably more than 7.5% (measured according to DIN EN ISO 4629-2) or an OH number of ≥240 mg KOH/g, preferably a ≥245 mg KOH/g, even more preferably ≥247 mg KOH/g, measured according to DIN 53 240.

Preferred Composition

Preferred compositions for orange, white, red and blue are listed in table 3 (coating compositions) and table 4 (cured coating).

TABLE 2 example of coating compositions

| Amount of element [wt. %] | coating composition colour | | | |
|---|---|---|---|---|
| | Orange | White | Red | Blue |
| Hostaperm ™ Yellow H3G | 6.47 | | | |
| Hostaperm ™ Orange GR | 1.88 | | | |
| Kronos ™ 2310 | 7.25 | 35.41 | 3.37 | 22.42 |
| Irgazin ™ Red | | | 5.51 | |
| Cinquasia ™ Red | | | 0.58 | |
| Lamp Black 101 | | | 0.01 | |
| Heliogen ™ Blau L 7085 | | | | 1.77 |
| Butyl acetate | 14.79 | 13.94 | 19.61 | 12.21 |
| Disperbyk ™-161 | 4.84 | 3.54 | 3.26 | 3.34 |
| Aeroxide AluC | 0.19 | 0.57 | 0.17 | 0.87 |
| WorléePol ™ VP 6778 | 12.85 | 5.52 | 11.47 | 10.85 |
| WorléeAdd ™487 | 0.42 | 0.54 | 0.43 | 0.37 |
| BYK ™-306 | 0.13 | 0.16 | 0.13 | 0.11 |
| Tolonate ™ HDT-LV2 | 7.28 | 3.95 | 11.64 | 6.01 |
| Ethyl lactate | 34.84 | 24.66 | 31.79 | 31.15 |
| Mineral corundum F800 | 9.08 | 11.73 | 12.02 | 10.90 |

TABLE 3 example of coatings

| Amount of element [wt. %] | coating colour | | | |
|---|---|---|---|---|
| | Orange | White | Red | Blue |
| Hostaperm ™ Yellow H3G | 14.69 | | | |
| Hostaperm ™ Orange GR | 4.26 | | | |
| Kronos ™ 2310 | 16.45 | 57.66 | 6.93 | 39.58 |
| Irgazin ™ Red | | | 11.35 | |
| Cinquasia ™ Red | | | 1.19 | |
| Lamp Black 101 | | | 0.02 | |
| Hellogen ™ Blau L 7085 | | | | 3.12 |
| Butyl acetate | 3.29 | 5.76 | 6.70 | 5.89 |
| Disperbyk ™-161 | 0.43 | 0.92 | 0.35 | 1.54 |
| Aeroxide ™ AluC | 22.76 | 9.00 | 23.61 | 19.17 |
| WorléePol ™ VP 6778 | 0.75 | 0.87 | 0.89 | 0.65 |
| WorléeAdd ™487 | 0.25 | 0.26 | 0.27 | 0.19 |
| BYK ™-306 | 16.52 | 6.43 | 23.95 | 10.61 |
| Mineral corundum F800 | 20.60 | 19.10 | 24.74 | 19.25 |

The coatings according to the invention have been proven to show high abrasion and scratch resistance, high durability and/or high optical covering power.

In the context of pigmented paints/varnishes/lacquers, covering power refers to the hiding power, in other words to the degree to which the paint/varnish/lacquer is capable of covering a surface so that the surface cannot be seen through the coating anymore. The covering power is proportional to the difference in the refractive indexes of a pigment and the film-forming vehicles. Covering power is also dependent on pigment properties. The greater the covering power, the less paint is required per unit of surface area. Visual and photometric inspection procedures may be used to determine the covering power of a coating.

Durability in the context of the invention means resistance against influence of light, in particular ultraviolet light, temperature, humidity and other influences of the environment. In particular, durability means that the coating is not discoloured, e.g., not yellowed under normal use conditions of a watch.

Abrasion and scratch resistance describe the ability of a material to resist various types of damage such as scratches, gouges, wear and other flaws. Abrasion resistance is defined as a material's capacity to oppose mechanical action such as friction, scraping and erosion and scratch resistance is the ability of a material to resist mechanical damages that can lead to visible trenches.

Abrasion resistance can be measured by an abrasion test and scratch resistance can be measured by a scratch resistance test as described below.

The coating of the invention which is obtained by applying and drying the composition has a high dynamic modulus, preferably >$10^9$ Pa measured by Dynamic mechanical analysis (DMA).

Further, the coating has a high resistance to humidity of 0.4 to 0.6% of water intake with an isotherm of 24 h at 40° C. and 60% RH, measured by Dynamic Vapor Sorption (DVS).

The obtained coating has a $T_g$ of between 55 and 71° C., measured by differential Scanning Calorimetry under Nitrogen (DSC).

EXAMPLES

Example A (Filler Paste)

A filler paste is prepared by mixing 0.167 g butyl acetate, 0.833 g of ethyl lactate, and 0.217 g of Alumina ($Al_2O_3$ such as Alodur® corundum F800).

Example B (Coloured Pre-Mix)

An example of a preparation of a pre-mix in two steps is detailed hereafter.

A first paste is prepared by mixing 99.72 g Hostaperm™ Yellow H3G; 28.82 g Hostaperm™ Orange GR, 111.71 g, Kronos™2310, 199.16 g WorléePol™ VP6778, 74.47 Disperbyk-161 and 120.52 g butyl acetate.

For the first paste, butyl acetate, Disperbyk®-161 and WorléePol™ VP6778 are weighed out into a tin can.

This first paste is stirred briefly with a dissolver. Then all three pigments are added at once. The pigments are allowed to immerge into the liquid by slightly swinging the tin can or by stirring with a spatula.

The first paste is stirred with the dissolver (10-15 min at 3000 rpm).

The first paste is grinded twice using the DYNO® Mill and 0.5 mm Zirconia beads at a speed of 5700 rpm. After the second run the size of the biggest particle is determined by grindometer method.

A pre-mix is prepared by adding to the first paste 2.84 g Aeroxid® Alu C, 1.92 g BYK®-306 and 6.41 g WorléeAdd® 487 (since some product is lost in the milling process, the amount has to be adjusted to achieved the aimed composition of the coating).

Then the pre-mix is stirred with Dispermat® (10-15 min at 3000 rpm, slow addition of Aeroxid® or first stirring with a spatula, in order to avoid spinning around of the powder).

Then it is stirred again with Dispermat® (10-15 min at 3000 rpm, slow addition of Aeroxid® or first stirring with a spatula, in order to avoid spinning around of the powder).

The pre-mix obtained is milled once again with the bead mill.

Example C (Black Composition)

A coloured black paste is prepared by mixing 24.2 g Solsperse®32500, 29.3 g WorléePol™ VP 6778, 5 g Aeroxide™ Alu C and 22.1 g butyl acetate. This first mixture is weighed in a tin can and stirred with a dissolver (disc diameter=4 cm) for 5 min at 3000 rpm. 50 g Emperor® 1200 (carbon black) is weighed in a polypropylene beaker and added to the first mixture. The coloured black paste, i.e., first mixture+carbon black, is stirred for 5 min at 3000 rpm. The obtained coloured black paste is then grinded with a bead mill.

The milling is carried out with a DYNO Mill Research Lab from WAB. Zirconia grinding beads with diameter of 0.5 mm are used. The grinding speed is 6000 rpm. The coloured black paste is grinded until the grain size is smaller than 5 µm. The pigment dispersion has to be stirred and grinded immediately. After two milling steps, the coloured black paste is stable and sedimentation does not occur anymore. The particle size decreases from ca. 30 µm to <1 µm during six milling steps.

45.4 g of the obtained coloured black paste, 11 g of commercially available functionalized alumina particles (70 wt. %: Alodur® corundum F500 12.8±1 µm and 30 wt. %: Alodur® corundum F800 6.5±1 µm; 30 wt. %, both obtainable from IEPCO) and 9.6 g of Tolonate™ HDT-LV2 are weighed in a polypropylene beaker and stirred with a dissolver (disc diameter=2 cm) for 5 min at 4000 rpm (first mixture). 1 g WorléeAdd®487, 0.3 g BYK®-306 and 30.4 g butyl acetate are weighed separately in a beaker, mixed well with a spatula and added to the first mixture to form a second mixture. The second mixture is stirred for 2 min at 4000 rpm. Finally, 2.3 g Acematt® 3300 is added and the whole mixture, i.e., the black coating composition, is stirred for 10 min at 5000 rpm. To remove the air, the black coating composition is placed in an ultrasonic bath for 5 min.

The black coating composition is used for spray coating on a stainless steel substrate 904L. Substrates are beforehand washed with acetone followed by a second washing with ethanol. Finally, the washed substrate is dried by evaporating the ethanol.

The black coated substrates are placed in an oven for 5 min at 80° C. and completely dried at 100° C. for 25 min.

Curing of the black coating composition occurs in two steps: 5 minutes at 80° C. followed by 25 minutes at 100° C.

Example D (Pantone 1575c Composition)

Example D leads to a specific Pantone orange colour (1575C).

Coloured pastes detailed below are prepared by mixing the constituent together. The coloured pastes are milled down with a DYNO® Mill Research Lab from WAB (Grinding beads with diameter of 0.5 mm; grinding speed of 6000 rpm). The pastes are grinded once (discontinuously). The particle size in the homogenised pastes is determined with a grindometer from TQC.

A coloured white paste is prepared with 65 wt. % of titanium oxide (Kronos™ 2310), 22.5 wt. % WorléePol™ VP 6778, 7.9 wt. % butyl acetate, 4.3 wt. % Disperbyk®-161 and 0.3 wt. % Aerosil® 200. The coloured white paste is milled down to a particle size<10 µm.

A coloured yellow paste is prepared with 30 wt. % Hostaperm™ Yellow H3G, 40 wt. % WorléePol™ VP 6778, 15 wt. % butyl acetate and 15 wt. % Disperbyk®-161. The coloured yellow paste is milled down to a particle size<5 µm.

A coloured orange paste is prepared with 12 wt. % Hostaperm™ Orange GR, 16 wt. % WorléePol™ m VP 6778, 65 wt. % butyl acetate and 7 wt. % Disperbyk®-161. The coloured orange paste is milled down to a particle size<5 µm.

To prevent sedimentation of the particles, an anti-settling agent is added to the coating composition. In order to uniformly disperse the anti-settling agent, an anti-settling paste is prepared by mixing 68.4 wt. % WorléePol™ VP6778, 20.6 wt. % butyl acetate and 11 wt. % Aeroxide® AluC. The anti-settling agent paste is milled.

Starting from the coloured and the anti-settling pastes, coating compositions are prepared by adding the binder (isocyanate (Tolonate™ HDT-LV2)), the solvent (ethyl lactate), filler particles, additives and customary auxiliaries (adhesion promoter and wetting agent) as summarized in Table 3.

16.6 g white paste, 28.8 g yellow paste, 16.8 g orange paste, 4.3 g anti-settling paste, 17 g butyl acetate, 1 g WorléeAdd®487, 0.3 g BYK®-306, 15.2 g isocyanate (Tolonate™HDT-LV2) and 17.7 g microdiamonds (70 wt. %: 8-15 µm+30 wt. %: 0.5-1 µm; 30 wt. %) are mixed.

Bar coating is done on clean flat steel plates with a 75 µm Meyer bar at a speed of 25 mm/s.

The coated substrates are cured 30 min at 100° C. in a preheated oven.

Example E (Orange Composition on a Watch Bezel)

Example E leads to a ceramic bezel with orange markings.

A ceramic bezel is commonly obtained by injection with recesses on the surface, then the green body is debound and sintered. The bezel surface is sand blasted with corundum in a sand blasting equipment and the bezel is carefully washed and dried.

A filler paste is prepared by mixing 0.167 g butyl acetate, 0.833 g of ethyl lactate, and 0.217 g of functionalized alumina ($Al_2O_3$ such as Alodur® corundum F800).

A pre-mix is prepared as described above In Example B.

A coating composition is prepared by mixing 1.217 g of the filler paste with 0.174 g Tolonate™ HDT-LV2 and 1 g of the pre-mix.

The coating composition is introduced in the container of a syringe and then deposited by a dispensing technique in recesses located on the surface of the bezel—either manually or either through a dispenser equipment driven by a robot.

The bezel is then dried at room temperature during one night.

The coating composition is cured in two steps: 1 h at 80° C. followed by 2 hours at 150° C.

Figure 3:
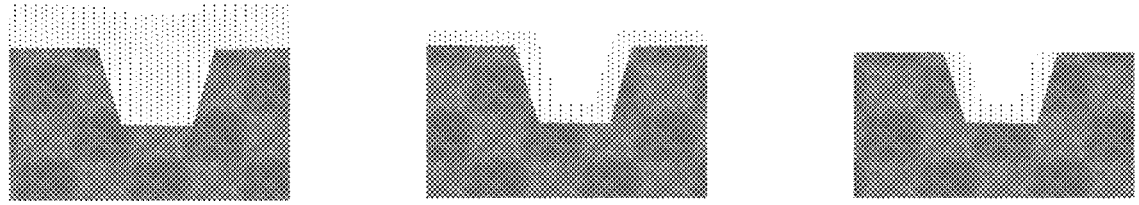
FIG. 3 is a schematic view of the coating process according to a second embodiment of the invention.
Figure 4:
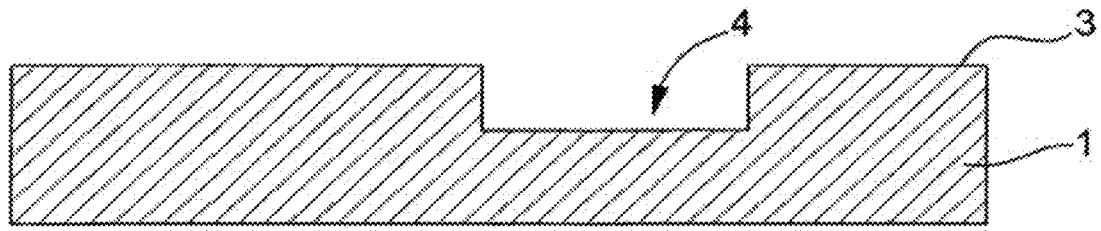
FIG. 4 is a schematic view of a component with a recess without coating.
Figure 5:
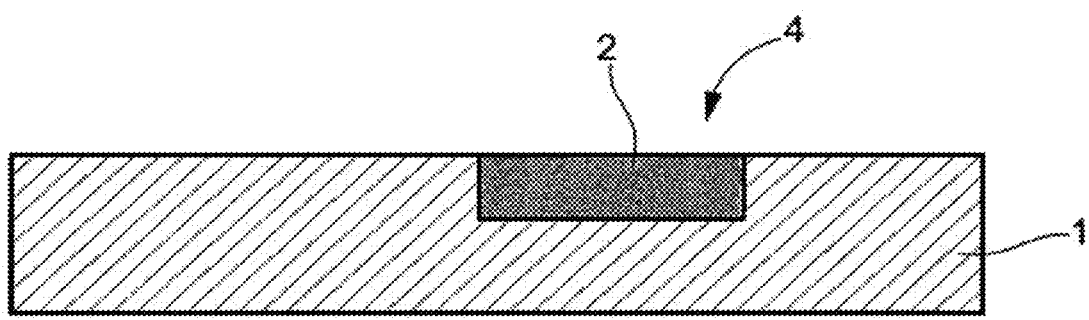
FIG. 5 is a schematic view of a component with a recess with a coating before curing.
Figure 6:
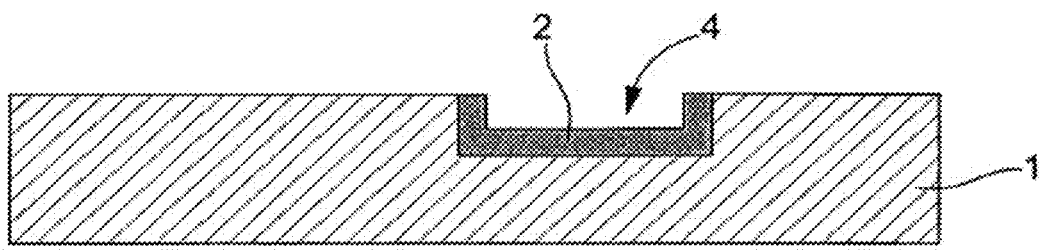
FIG. 6 is a schematic view of a component with a coated recess after curing.

Finally, the coated bezel surface is polished to remove the coating excess outside of the recesses as illustrated in FIG. 3.

Testing of the Coated Components

Coated components were tested in order to qualify the final result.

Comparative coated samples were obtained similarly by using different binders, i.e., WorléeCryl™=acrylic resin; Berlapoxy®=one component lacquer. Berlapoxy® is a special lacquer for watches available from Berlac A G, Switzerland. It is a two components epoxy resin stove enamel which can be baked at low temperatures such as 140° C.

Alteration Due to Physico-Chemical Interaction with Surrounding

The coating resistance to solvents and to synthetic sweat has been tested by immersing the coated substrate for a set time at a set temperature.

Gasoline (10 min, ambient temperature)
Bleach (Javel water) (10 min, ambient temperature)
Bleach (Javel water) (10 days, ambient temperature)
Methyl Ethyl Ketone (10 min, ambient temperature)
Artificial Sweat (20 g sodium chloride, 17.5 g ammonium chloride, 5 g urea, 2.5 g acetic acid, 15 g lactic acid) (24 h, 40° C.)
household detergent (Handy® purchased from Migros)+ Ultrasonic Bath (10 min, ambient temperature)

Figure 7:
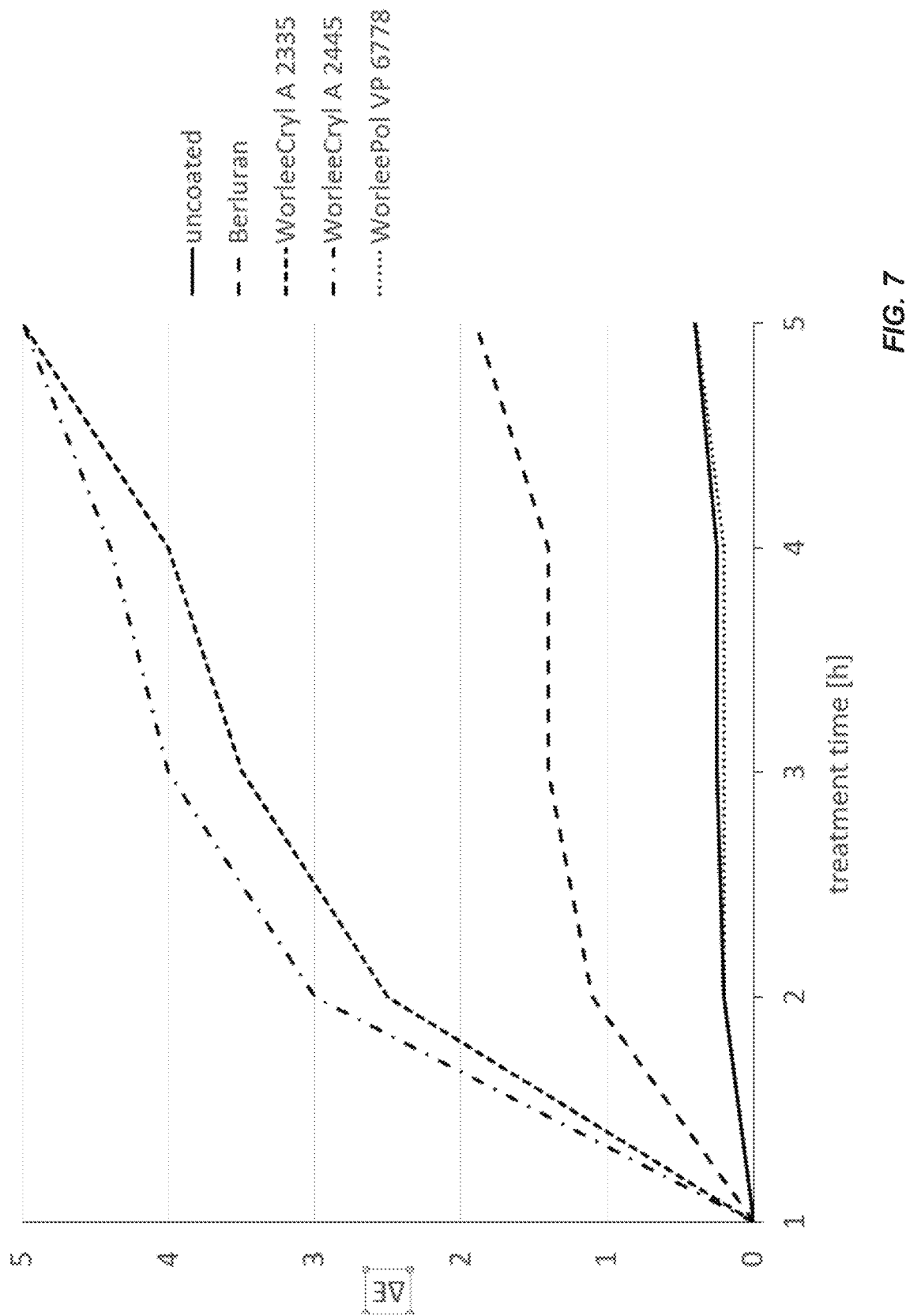
FIG. 7 gives ΔE*ab values for each coating obtained in the Examples depending on time treatment, between treated and untreated substrates.

The coated substrates were rinsed and controlled optically and compared to an un-tested sample, respectively. For the samples coated with the coating composition according to the invention (WorléePol® VP 6778), no change in appearance has been observed, i.e., no difference can be seen with naked eyes and the colour appears identical. The results are shown in Table 4. OK means no change of appearance.

the diagram ΔE-values (FIG. 7). The ΔE-value for the PU coating according to the invention is by far the smallest and most constant value. This fact is also visible by eye.

An orange coating according to the invention has been compared to a commercially available orange PU enamel-paint The commercial enamel-paint (Berlapoxy™) and the comparative coatings based on WorléeCryl™ A 2335 or WorléeCryl™ A 2445 show a yellowing contrary to the coating according to the invention (WorléePol™ VP 6778) for which no colour change is perceptible after 96 hours.

The influence of the ultraviolet light on the coating according to the invention is similar for all colours tested (results not shown). No difference can be seen with naked eyes and the colour appears identical.

Thermal Shock Resistance

The samples were immersed in a beaker containing water and placed in an oven at 70° C. for 1 hour. Thereafter, the beaker was removed from the oven and immediately placed in a fridge at 4° C. Such warm-cold cycle was repeated 4 times and then the samples were optically inspected for the appearance of cracks and compared to an untested sample.

No change in appearance has been observed for inventive coatings based on WorléePol™ VP 6778. Comparative coatings based on WorléeCryl™ A 2335 or 2445 show small cracks.

Moisture Resistance

The samples were placed in a humidity chamber with 100% relative humidity at 60° C. for 24 hours.

No change in appearance has been observed for all coatings tested.

Abrasion Resistance

The abrasion resistance of the coating was tested with an Elcometer®1720 Abrasion Tester using abrasive pads (Mio-

TABLE 4

Physico-chemical interaction with surroundings

| Binder | Solid content [wt. %] | Curing temperature | Gasoline 10 min | Bleach 10 min | Bleach 10 days | Methyl Ethyl Ketone 10 min | Artificial sweat 24 h, 40° C. | Detergent + ultrasonic bath 10 min | Thermal Shock 4-70° C. | UV treatment, mechanical aspect 24 h | Moisture resistance 24h, 60° C., 100% r.h. | UV treatment colorimetric aspects 24/48/72 h |
|---|---|---|---|---|---|---|---|---|---|---|---|---|
| WorléePol™ VP 6778 | 37% | 145° C., 30 min | OK | OK | OK | OK | OK | OK | OK | OK | OK | no colour change |
| Berlapoxy™ | 65% | 100° C., 30 min | OK | OK | OK | swelling chipping off | OK | OK | OK | chipping off | OK | minor yellowing |
| WorléeCryl™ A 2445 | 65% | 100° C., 30 min | OK | OK | damages at the edges | OK | OK | Chipping off | small cracks | OK | OK | yellowing |
| WorléeCryl™ A 2335 | 65% | 100° C., 30 min | OK | OK | OK | OK | OK | OK | small cracks | chipping off | OK | yellowing |

Ultraviolet Resistance

Tests were conducted according to the DIN EN ISO 11341:2004. CIE L*a*b-colour spaces were determined for all durations of ultraviolet-exposure and were compared. The ΔE between each sample/duration and untreated part of the relative tile were determined. ΔE describes the distance between two colours in the three-dimensional colour spaces. The smaller ΔE is, the more equal both colours are.

$$\Delta E_{p,v} = \sqrt{(L^*_p - L^*_v)^2 - (a^*_p - a^*_v)^2 - (b^*_p - b^*_v)^2}$$

The coating according to the invention is the most stable system concerning ultraviolet-stability. This fact is shown in brill® from Migros) with dimensions of 15×20 mm and loaded with 1800 g to get a pad pressure of 600 g/cm². The abrasive pad was actuated at a speed of 35 cycles/min, until the coating is removed. The abrasion rate is the thickness of the coating divided by the number of strokes.

The coating thickness was measured by the eddy current method using a Fischer Dualscope® MP40.

The abrasion resistance of the coating of the present invention has been compared to the abrasion resistance of a standard PVD coating and a coating without filler. The results are shown in Table 5.

TABLE 5

| Coating material | Thickness [μm] | Abrasion [nm/stroke] |
|---|---|---|
| PVD | 3 | 11 |
| Coating without filler | 40 | 50-55 |
| Coating according to the invention | 40 | 33 |

Effect of the Filler Size

Nanoparticles fillers are considered to be more advantageous than microparticles because it is possible to use more particles per unit area according to the literature (BYK Nanotechnology Additives for Functional Coatings, Dr. Michael Berkei, Oct. 21, 2013).

Surprisingly, it has been observed by the inventors that there is no clear improvement of the abrasion resistance of a coating by using nano- or submicron-particles compared to microparticles.

In order to prevent sedimentation of the microparticles, an anti-settling agent, such as Aerosil®200 or Aeroxide® Alu C, can be used. A smooth and defect free coating can be obtained.

$Al_2O_3$ particles functionalised with aminopropyltrimethoxysilane or microdiamonds give very good results regarding the improvement of the abrasion resistance.

Figure 8:
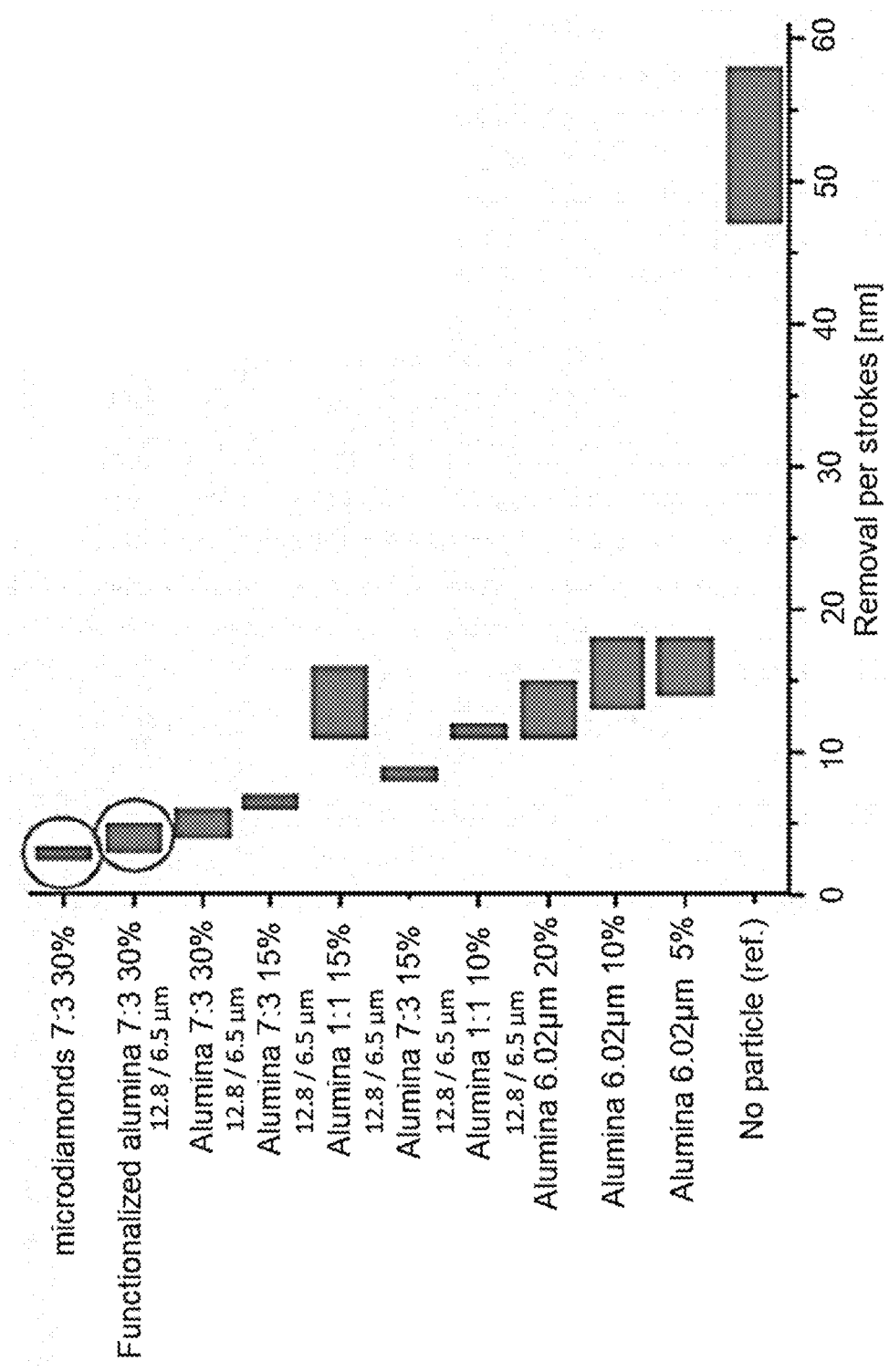
FIG. 8 is an overview of the tested microparticles relative to their influence on the abrasion resistance.

It has been observed that mixing particles having different sizes improves the abrasion resistance. A ratio of 70 wt. % of bigger particles mixed with 30 wt. % of smaller particles is more advantageous than a 1/1 ratio concerning the abrasion resistance. The ratio 7/3 corresponds to the closest packing of spheres, as is apparent form the following Table 6 and FIG. 8.

TABLE 6

| | Particle size (d50) | Amount | Removed coating/stroke |
|---|---|---|---|
| No filler | — | — | 47-58 nm |
| Not functionalized alumina | 70 wt. %: 12.8 ± 1 μm<br>30 wt. %: 6.5 ± 1 μm | 30 wt. % | 4-6 nm |
| Functionalized alumina | 70 wt. %: 12.8 ± 1 μm<br>30 wt. %: 6.5 ± 1 μm | 30 wt. % | 3-5 nm |
| Microdiamonds | 70 wt. %: 8-15 μm<br>30 wt. %: 0.5-1 μm | 30 wt. % | 2.5-3.4 nm |

Scratch Resistance

The scratch resistance of an orange coating according to the invention has been compared to two other coatings: a gold PVD coating (Physical Vapour Deposition) and a white resin coating made from a commercial supplier (Berlapoxy® 058). The scratch resistance was tested by scratching the surface of the sample with glass powder BREMOR BR550 on cotton pad during 2 minutes, and then with Scotch Brite 7440 pads during 1 minute.

The evaluation of the coated surfaces after the test shows that

PVD coating: scratches are dense and marked;

White commercial resin coating (Berlapoxy® 058): scratches are moderately dense and visible;

Coating according to the present invention: scratches are hardly visible.

Figure 9:
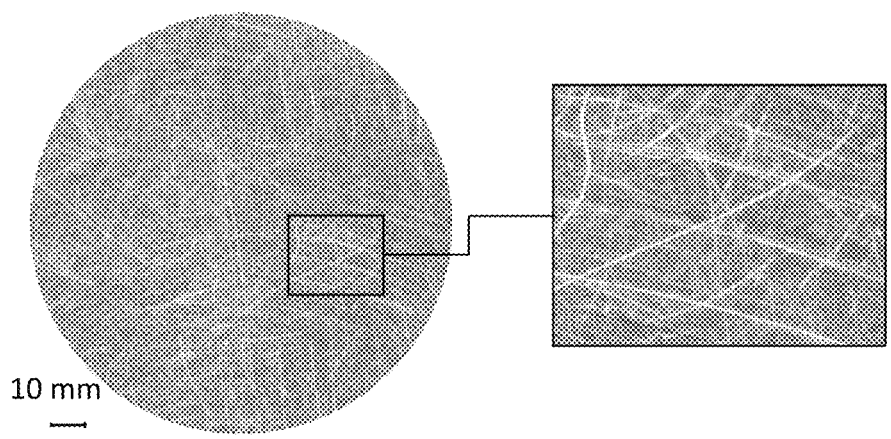
FIG. 9 shows the result of a scratch test on a comparative gold PVD coating.
Figure 10:
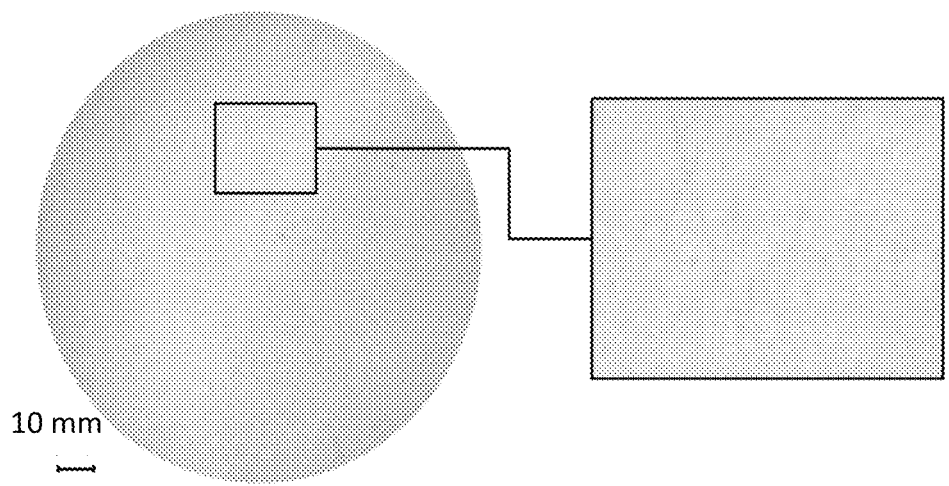
FIG. 10 shows the result of a scratch test on a comparative Berlapoxy 2K 058 coating.
Figure 11:
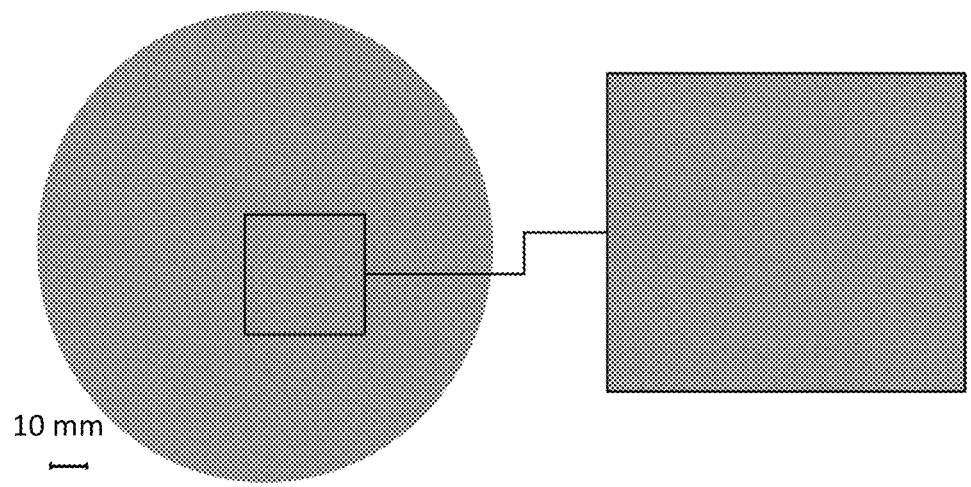
FIG. 11 shows the result of a scratch test on a coating according to the invention.

The results are shown in FIG. 9 to 11. Note: FIG. 11 represents an orange matte sample.

The invention claimed is:

1. A watch element having a coating thereon, the coating, comprising
    a binder which is a two-component polyurethane;
    one or more pigments; and
    at least one filler;
    wherein the watch element includes at least one recess and the coating is conformal to a geometry of the at least one recess.

2. The watch element according to claim 1, wherein the amount of pigment in the coating is 19 to 58 wt. % by weight based on total solids of the coating.

3. The watch element according to claim 1, wherein the coating has high scratch resistance, high durability and/or high optical covering power.

4. The watch element according to claim 1, wherein the coating has a mat, glossy or iridescent aspect.

5. A process for coating a watch element, wherein the coating is conformal, the process comprising the steps
    a) providing a substrate, the substrate having at least one recess;
    b) optionally preparation of one or more homogeneous pastes;
    c) optionally preparation of a pre-mix of different pastes obtained in step b);
    d) preparation of a coating composition, the coating composition comprising: a binder which is a two-component polyurethane; one or more pigments; and at least one filler;
    e) application of the coating composition onto the substrate such that the coating composition is conformal to the geometry of the at least one recess;
    f) optionally drying
    g) curing of the coating composition to form the coating.

6. A watch element obtainable by the process of claim 5.

7. The process according to claim 5, wherein the one or more homogenous pastes is a colour paste and/or a filler paste.

8. The watch element of claim 1, wherein the coating comprises an intense color, a dynamic modulus of $>10^9$ Pa measured by Dynamic Mechanical Analysis (DMA), a resistance to humidity of 0.4 to 0.6% of water intake with an isotherm of 24 h at 40° C. and 60% RH, measured by Dynamic Vapor Sorption (DVS), and a $T_g$ of between 55 and 71° C., measured by Differential Scanning calorimetry under nitrogen (DSC).

9. The watch element according to claim 1, wherein the coating composition includes a solvent configured to obtain a suitable viscosity and control an evaporation rate of the coating composition.

10. The watch element according to claim 1, wherein the one or more pigments includes a pigment paste comprising polyol.

11. The process according to claim 5, wherein during application of the coating composition into a recess, a deposited volume is adjusted to a volume of the recess.

12. The process according to claim 5, wherein preparation of the coating composition includes having 19 to 58 wt. % pigments based on total solids.

13. The process according to claim 5, wherein the cured coating has an intense colour.

14. The watch element according to claim 1, wherein the two-component polyurethane is based on an aliphatic diisocyanate and a polyol.

15. The watch element of claim 14, wherein the polyol has an OH content of 6 to 9% or an OH number between 50 and 240 mg KOH.

16. The watch element of claim 14, wherein the polyol is a polyester polyol or a polyether polyol.

17. The watch element of claim 14, wherein the aliphatic diisocyanate is isophorone diisocyanate or 4,4'-diisocyanatodicyclohexylmethan.

* * * * *